United States Patent
Pesati et al.

(10) Patent No.: US 7,657,925 B2
(45) Date of Patent: Feb. 2, 2010

(54) METHOD AND SYSTEM FOR MANAGING SECURITY POLICIES FOR DATABASES IN A DISTRIBUTED SYSTEM

(75) Inventors: Vikram Reddy Pesati, San Jose, CA (US); Srividya Tata, Mountain View, CA (US); Shiu Kau Wong, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 811 days.

(21) Appl. No.: 10/966,512

(22) Filed: Oct. 14, 2004

(65) Prior Publication Data

US 2006/0085837 A1 Apr. 20, 2006

(51) Int. Cl.
*H04K 1/00* (2006.01)
*G06F 17/30* (2006.01)

(52) U.S. Cl. .................. 726/1; 726/2; 726/4; 726/6; 707/1; 707/9; 707/100; 713/165; 713/166

(58) Field of Classification Search .............. 726/1; 713/166; 707/9
See application file for complete search history.

(56) References Cited

U.S. PATENT DOCUMENTS

| | | | |
|---|---|---|---|
| 5,787,428 A * | 7/1998 | Hart | 707/9 |
| 6,292,900 B1 * | 9/2001 | Ngo et al. | 726/6 |
| 6,295,527 B1 * | 9/2001 | McCormack et al. | 707/3 |
| 2002/0143735 A1 * | 10/2002 | Ayi et al. | 707/1 |
| 2003/0196108 A1 * | 10/2003 | Kung | 713/200 |
| 2004/0044655 A1 * | 3/2004 | Cotner et al. | 707/3 |

* cited by examiner

*Primary Examiner*—Edan Orgad
*Assistant Examiner*—Jenise E Jackson
(74) *Attorney, Agent, or Firm*—Park, Vaughan & Fleming, LLP; Edward J. Grundler (57) ABSTRACT

One embodiment of the present invention provides a system that facilitates managing security policies for databases in a distributed system. During operation, the system creates multiple label security policies. The system stores these security policies in a directory and automatically propagates them from the directory to each database within the distributed system. In doing so, the system allows for applying policies to individual tables and schema in any database in the distributed system. The system facilitates centralized administration of security policies and removes the need for replicating policies, since the policy information is available in the directory.

21 Claims, 11 Drawing Sheets

METHOD AND SYSTEM FOR MANAGING SECURITY POLICIES FOR DATABASES IN A DISTRIBUTED SYSTEM

RELATED APPLICATION

The subject matter of this application is related to the subject matter in a co-pending non-provisional application by Rae K. Burns, Patrick F. Sack, and Vikram Reddy Pesati entitled, "Techniques for Adding Multiple Security Policies to a Database System," having Ser. No. 10/006,543, and filing date 30 Nov. 2001, which is incorporated by reference herein.

BACKGROUND

1. Field of the Invention

The present invention is related to database security. More specifically, the present invention is related to a method and an apparatus for managing security policies for databases in a distributed system

2. Related Art

Many commercial database systems provide access controls that limit the operations that can be performed by various users. For example, a user who correctly enters a user identification (user ID) and a password is typically allowed to access the database system as an authorized user. One or more privileges are assigned to each authorized user, wherein a privilege defines specific operations the authorized user may perform on database objects. For example, a user may have a privilege that allows the user to read all data in a table, but does not allow the user to write data to the table.

Note that database operations include data manipulation operations and database definition operations. Data manipulation operations can include adding a row, deleting a row, and modifying contents of a row, among others. Database definition operations can include adding a table, adding a column to a table, and adding an index for a table, among others. Other database operations can include logging on to the database system and establishing a communication session with a database server.

Access controls provided by early commercial database system frequently did not satisfy access control requirements for some organizations. For example, once a user was granted access rights to a database, the user had access to all tables in the database. This type of access control does not support security policies, such as multi-level security policies. For example, information in a database containing information about military units and their capabilities is typically subject to a multi-level security policy. The multiple levels include "unclassified," "confidential," "secret," and "top-secret." According to this policy, information classified as secret may be accessed only by users who are cleared through the secret level or higher. Hence, information that is secret may be accessed by a user cleared through secret and top-secret levels, but not by an uncleared user or a user cleared through only the confidential level.

In order to implement a multi-level security policy in a system that provides conventional access controls, data for each different security level must be kept in a separate database. Placing data in separate databases based on security level increases storage space requirements, greatly decreases efficiency of many database operations, and often leads to inconsistencies between copies of the same data stored in separate databases.

One approach to providing the access control required by a multi-level security policy is to store data with different security levels data in different tables of the same database. In some cases, the tables are stored in separate files with access to the files controlled by the operating system. Placing data in separate tables and files based on security level is still very inefficient because database operations have to access multiple tables and files and multiple copies of the same data may be stored in the separate tables and files leading to the same problems encountered when using separate databases.

In some database systems, information associated with different security levels is contained in a single database object. For example, access controls can be applied separately to each row in a table. However, this type of system still has drawbacks.

One drawback is that typically only one "security policy" is provided for the database system, yet one security policy may not meet the needs of all users. For example, the multi-level policy does not suit some commercial applications that need to control access to corporate data based on levels within the corporation's hierarchy. In another example, the multi-level policy may not match file access controls of a UNIX operating system, which provides user, group, and world permissions separately for reading and writing files. One user may want to apply the corporate hierarchy levels, another user may want to apply the UNIX operating system controls, and a third user may want to apply a combination of both on the same data. Using conventional approaches, three different database servers would have to be configured to support these three different policies.

Another drawback is that any modification to the security policy typically requires changes to instructions scattered throughout the database system. This makes the task of managing the security policy difficult, costly, and prone to error, and can result in unanticipated and undesired side effects. For example, programmers responsible for modifying the code of a database server to implement a single change in a security policy may make modifications to seven distinct places in the code, without realizing that modifications are also required at two other locations. By failing to make changes in all locations, the database server may fail to operate properly, and may even operate in a manner directly contrary to the policy change for which modifications were being made.

Furthermore, it is often desirable for a security policy to be added to an existing database server without taking the database server offline, so that users of a database system are not prevented from continuing to perform database operations while the change in security policy is taking place.

Database designers have addressed the above problems by using label-based security policies. These label-based security policies are described in the related application entitled, "Techniques for Adding Multiple Security Policies to a Database System," having Ser. No. 10/006,543, and filing date 30 Nov. 2001, which is incorporated by reference above.

Briefly, these label-based security policies operate by adding label columns into database tables. These columns contain attributes that specify what is required to access data within the associated row within the table.

Currently, implementations of these label-based security policies and authorizations are defined and managed separately for each database. This places a large burden on database administrators who are often required to configure many databases with the same security policies. Furthermore, management of label authorizations often requires the same modifications of authorization to be performed on multiple databases scattered throughout an enterprise. In a large enterprise with numerous user accounts and databases, an administrator may not be able to make all of these changes in a timely manner which leads to increased security risks.

Hence, what is needed is a method and an apparatus for centralized management of security policies for multiple databases in a distributed system without the above described problems.

SUMMARY

One embodiment of the present invention provides a system that facilitates managing security policies for databases in a distributed system. During operation, the system creates multiple label security policies. The system stores these security policies in a directory and automatically propagates them from the directory to each database within the distributed system. In doing so, the system allows for applying policies to individual tables and schema in any database in the distributed system. Labels are stored in the policy columns of the individual tables for access controls to be enforced. The system facilitates centralized administration of security policies and removes the need for replicating policies, since the policy information is available in the directory.

In a variation of this embodiment, upon receiving a request to perform an operation on a specified table in a database, the system determines which security policies apply to the table based on a policy set of one or more policies associated with the table. The system then determines whether to perform the operation on a row of the table based on a set of labels associated with the row and the set of labels and privileges of the user, wherein the set of labels is obtained from the policy set.

In a further variation, the system adds a policy column to the table for each policy in the policy set associated with the table.

In a further variation, the system stores a label in the policy column for each row. The label is from the set of labels associated with the policy.

In a further variation, determining which policies apply involves determining whether a column is a policy column, and, if so, enforcing access controls based on the label in the policy column.

In a further variation, the policy set associated with the table includes two or more policies.

In a further variation, the system provides feedback from a database indicating that a policy is in-use. The feedback updates policy information within the directory when the security policy is being applied to tables and schemas. This ensures that security policies that are in-use will not be dropped from the directory.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Distributed Database System

Figure 1:
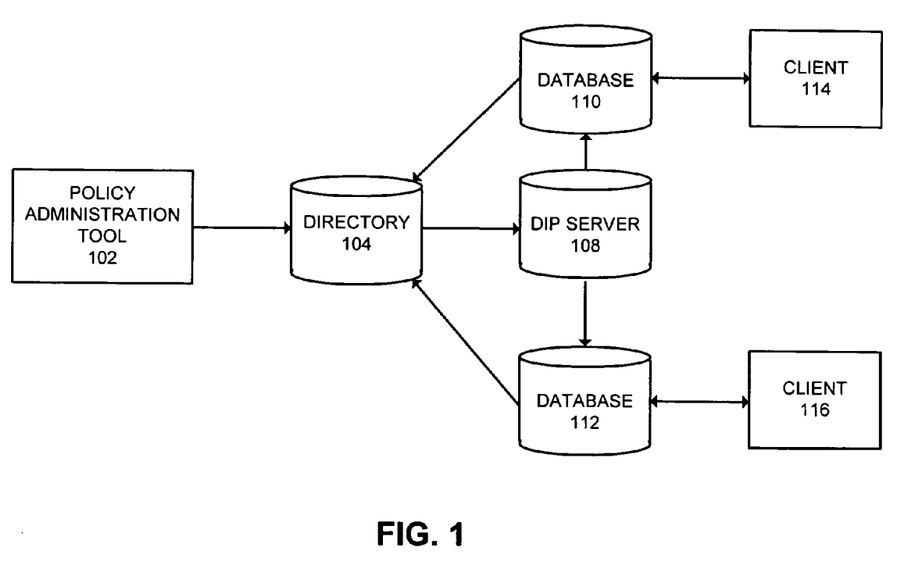
FIG. 1 illustrates a distributed database system in accordance with an embodiment of the present invention.

FIG. 1 illustrates a distributed database system in accordance with an embodiment of the present invention. The distributed database system illustrated in FIG. 1 includes directory 104, directory integration platform (DIP) server 108, databases 110 and 112, policy administration tool 102, and clients 114 and 116. These elements can be coupled together using any type of wire or wireless communication channel capable of coupling together computing nodes. This includes, but is not limited to, a local area network, a wide area network, or a combination of networks. In one embodiment of the present invention, portions of the distributed system are coupled together through the Internet.

Policy administration tool 102 provides the mechanisms for an "administrator of administrators" to create and update the label-based security policies. These policies are stored on directory 104 and are made available to the system from directory 104. Directory 104 can be any type of directory system that is able to store and supply the label-based security policies. In one embodiment of the present invention, directory 104 is a lightweight directory access protocol (LDAP) directory.

DIP server 108 receives the label-based security policies and provides the label-based security policies to registered databases, such as databases 110 and 112. Users can access databases 110 and 112, respectively, through clients 114 and 116. Note that the distributed system is not limited to two databases and two clients. There can be many more databases, and each database can be accessed by multiple clients. During operation, databases 110 and 112 provide feedback to directory 104 when a label-based security policy is used, thereby allowing the system to prevent directory 104 from deleting "in-use" security profiles.

Label Based Security Policy Hierarchy

Figure 2:
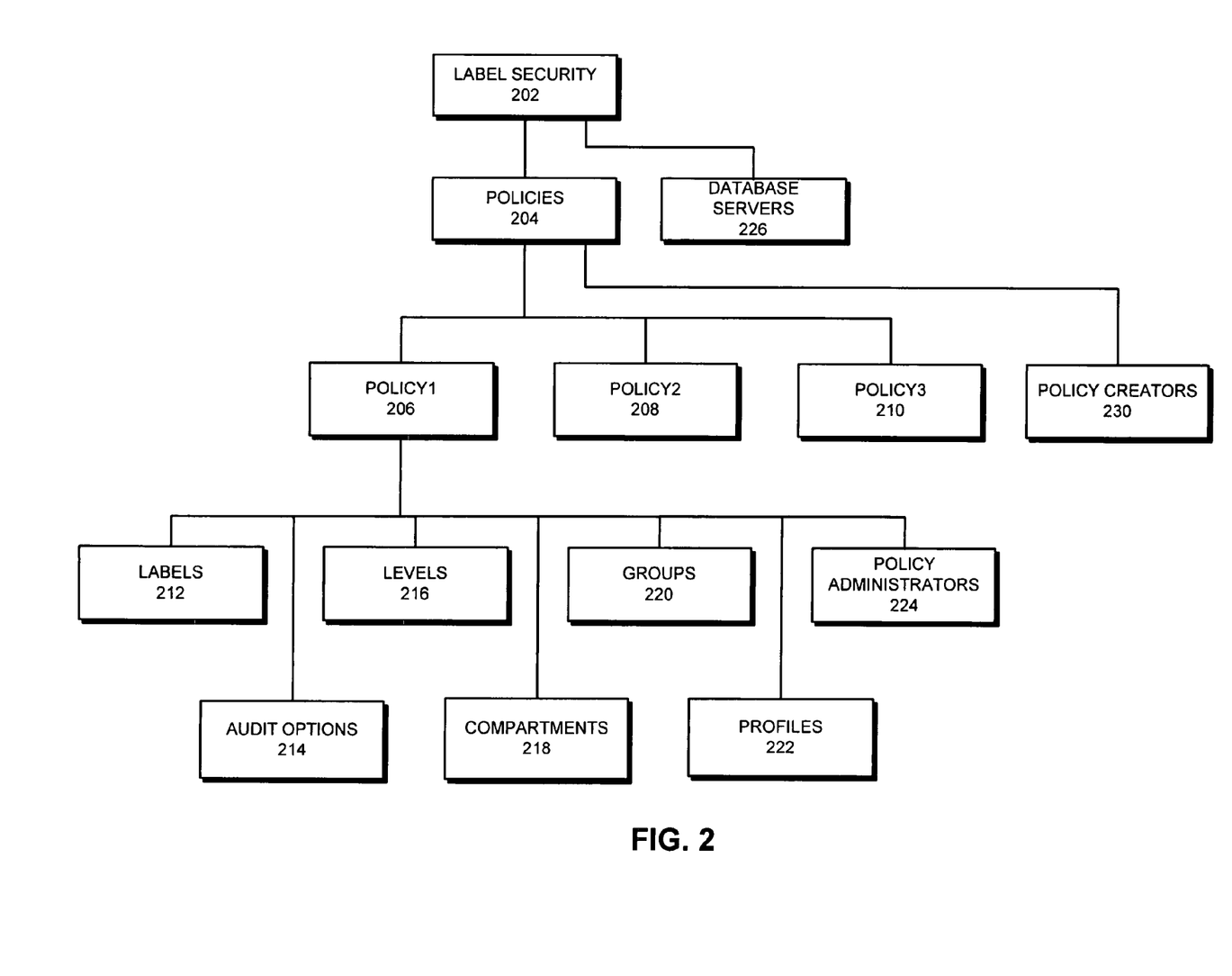
FIG. 2 illustrates the label based security policy hierarchy in accordance with an embodiment of the present invention.

FIG. 2 illustrates the label based security policy hierarchy in accordance with an embodiment of the present invention. Label security 202 is at the top of the hierarchy. Policies 204 and Database Servers 226 are in the first level under label security 202. Policy Creators 230 and various label based policies, for example policy1 206, policy2 208, and policy3 210, are subordinate to policies 204. Each of these policies includes several subordinate sections. For example, policy1 206 includes labels 212, audit options 214, levels 216, compartments 218, groups 220, profiles 222, and policy administrators 224. Each of these items is described more fully below.

Label-Based Security Policy

Figure 3:
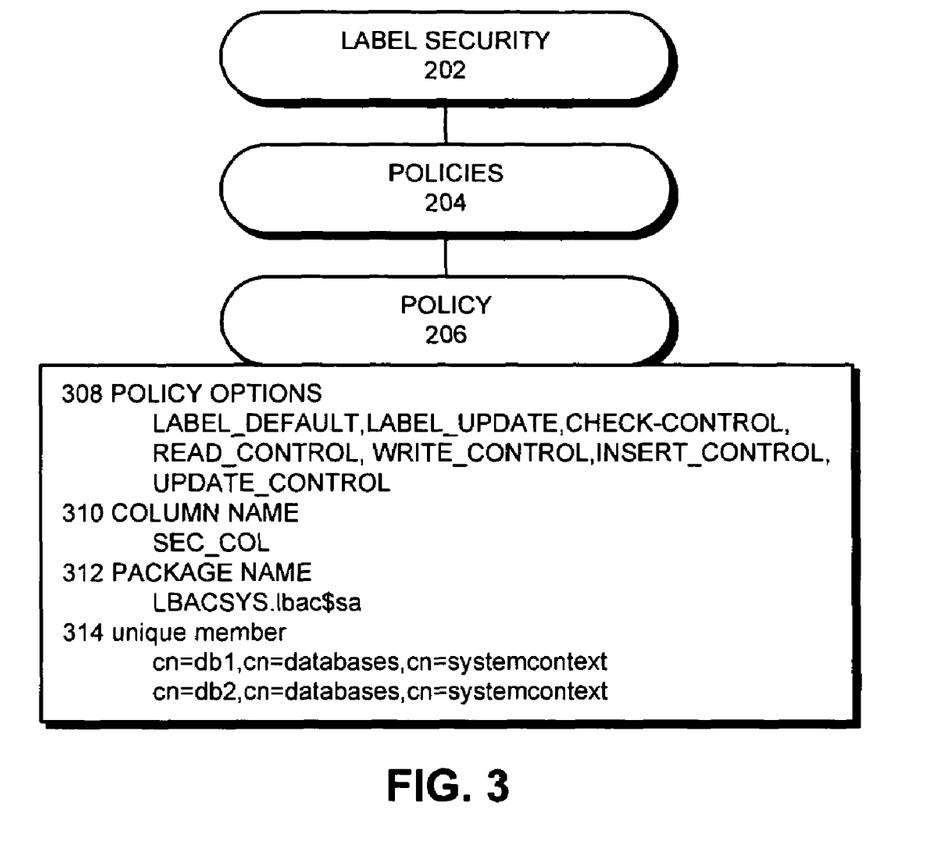
FIG. 3 illustrates a policy in a label-based security system in accordance with an embodiment of the present invention.

FIG. 3 illustrates a policy of a label-based security system in accordance with an embodiment of the present invention. Label security 202 is a directory entry within directory 104 which lists, inter alia, policies 204. Policies 204 includes a listing of label-based security policies. Policy 206 is exemplary of the label-based security policies listed in policies 204.

Policy 206 includes policy options 308, column name 310, package name 312, and unique members 314. Policy options 308 includes a listing of the various options that are implemented for policy 206. Column name 310 provides the name of the label-based security column, which is added into affected tables within the various databases. Package name 312 denotes the name of the policy package that implements the policy. Unique member 314 stores the distinguished names of the databases which subscribe to the policy 206. Note that the semantics of each of these portions of policy 206 are system dependent; however a practitioner with ordinary skill in the art will be able to readily adapt this description to any system.

Audit Options

Figure 4:
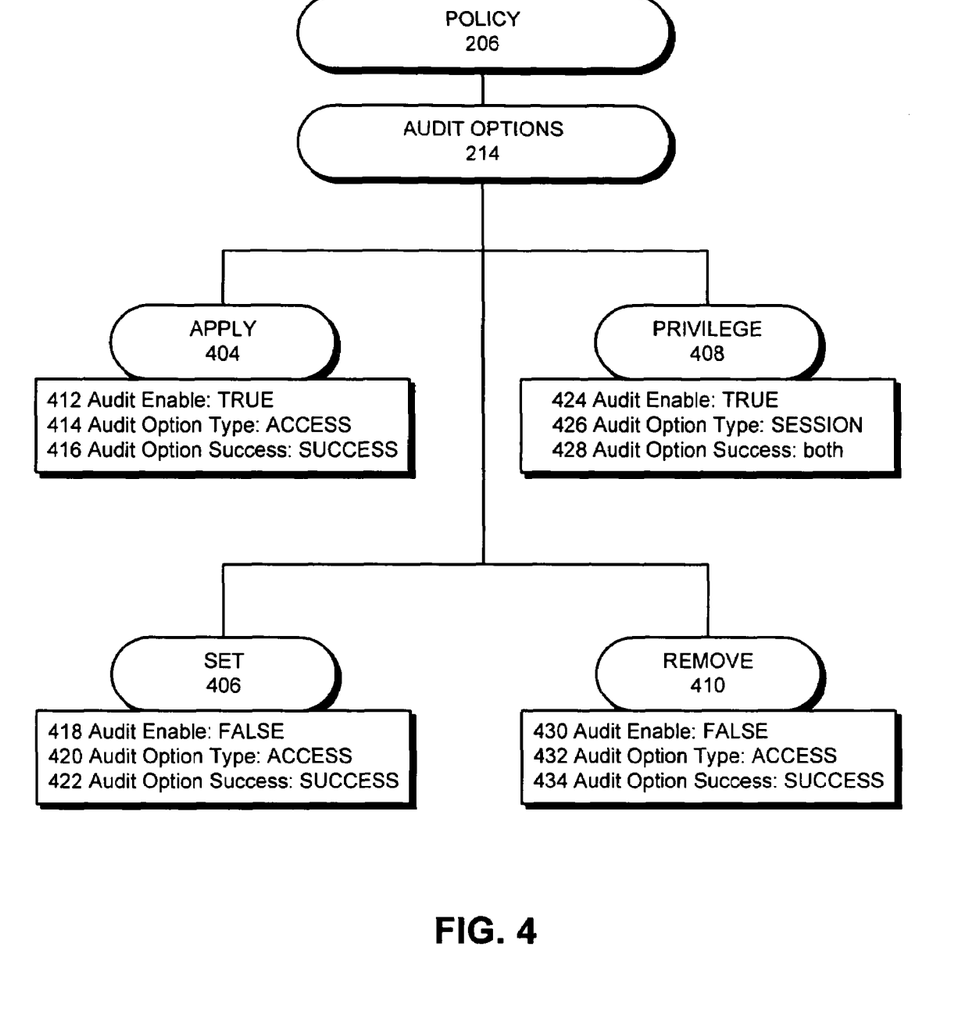
FIG. 4 illustrates audit options for a security policy in accordance with an embodiment of the present invention.

FIG. 4 illustrates audit options for a security policy in accordance with an embodiment of the present invention. Label-based security policy 206 includes audit options 214. The audit options include apply 404, set 406, privilege 408, and remove 410. Other audit options are possible. The audit options for apply 404 include audit enable 412, audit option type 414, and audit option success 416. These audit options are currently set to TRUE, ACCESS, and SUCCESS, respectively.

The audit options for set 406 include audit enable 418, audit option type 420, and audit option success 422. These audit options are currently set to FALSE, ACCESS, and SUCCESS, respectively.

The audit options for privilege 408 include audit enable 424, audit option type 426, and audit option success 428. These audit options are currently set to TRUE, SESSION, and BOTH, respectively.

The audit options for remove 410 include audit enable 430, audit option type 432, and audit option success 434. These audit options are currently set to FALSE, ACCESS, and SUCCESS, respectively.

Label Components for the Policy

Figure 5:
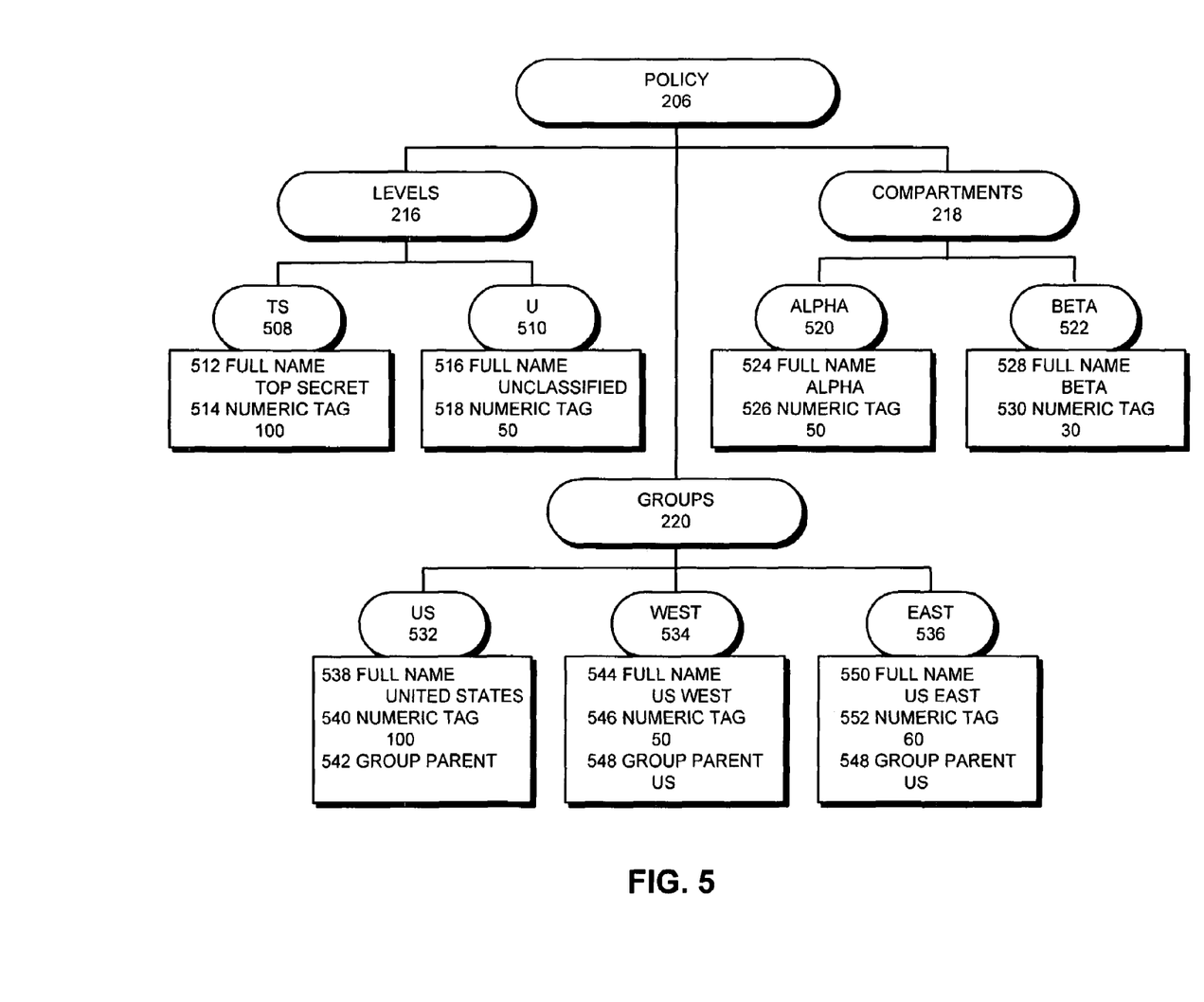
FIG. 5 illustrates label components for a security policy in accordance with an embodiment of the present invention.

FIG. 5 illustrates label components for a security policy in accordance with an embodiment of the present invention. Security policy 206 includes levels 216, compartments 218, and groups 220.

Levels 216 include listings for security levels, for example the military security classification system of unclassified, confidential, secret, and top-secret. Under this system, a person cleared to a given level has access to information at that level and any lower level. For example, a person cleared to the secret level can access confidential and unclassified data.

Levels 216 include TS 508 and U 510 for top-secret and unclassified. Note that S and C for secret and confidential can also be included. TS 508 includes full name 512 and numeric tag 514, which are set to top-secret and 100, respectively. U 510 includes full name 516 and numeric tag 518, which are set to unclassified and 50, respectively. Note that in levels 502, the numeric tags must be monotonically increasing or monotonically decreasing for increasing security levels.

Compartments 218 include listings for compartmentalized access. To access data that is in a specific compartment, a user must be cleared for that specific compartment. There is no hierarchical arrangement for compartments. Compartments 504 include alpha 520 and beta 522. Alpha 520 includes full name 524 and numeric tag 526, which are set to ALPHA and 50, respectively. Beta 522 includes full name 528 and numeric tag 530, which are set to BETA and 30, respectively. Note that the numeric tags within compartments 504 must be unique for each compartment but that there is no hierarchical order for these numeric tags.

Groups 220 include listings for hierarchical access, which might be found within an enterprise system. Groups typically include entries which mimic the divisions within the enterprise system; for example, western and eastern divisions under the United States group. Groups 506 include US 532, west 534, and east 536. US 532 includes full name 538, numeric tag 540, and group parent 542. These fields are set to UNITED STATES, 100, and NULL, respectively. Note that group parent 542 is set to NULL because US 532 is the parent group of all the other groups.

West 534 includes full name 544, numeric tag 546, and group parent 548. These fields are set to US WEST, 50, and US, respectively. East 536 includes full name 550, numeric tag 552, and group parent 554. These fields are set to US EAST, 60, and US, respectively.

Multiple Security Policies

Figure 6:
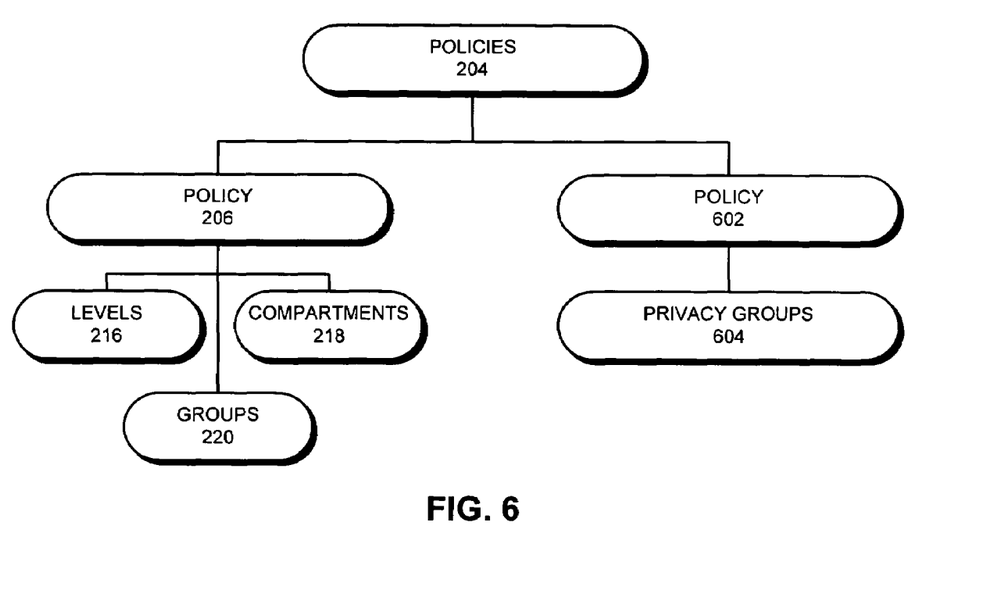
FIG. 6 illustrates multiple security policies in accordance with an embodiment of the present invention.

FIG. 6 illustrates multiple security policies in accordance with an embodiment of the present invention. Policies 204 includes policies 206 and 602. Policy 206 is a standard label-based policy (as described above with reference to FIG. 4) and includes levels 216, compartments 218, and groups 220. Policy 602 includes privacy groups 604. Privacy groups 604 is a custom label-based policy and can be extended with other subordinate components as needed.

Labels

Figure 7:
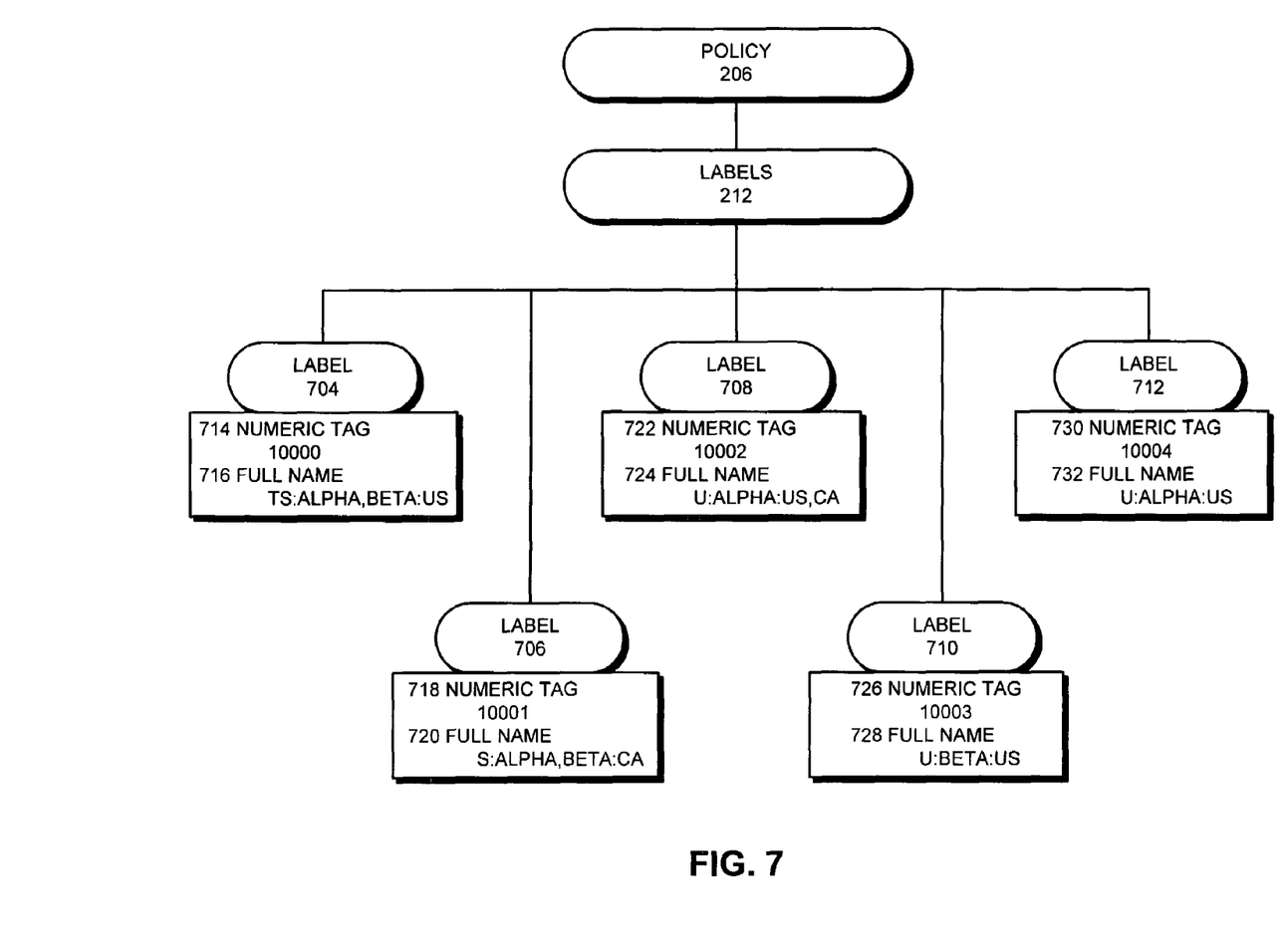
FIG. 7 illustrates security policy labels in accordance with an embodiment of the present invention.

FIG. 7 illustrates security policy labels in accordance with an embodiment of the present invention. Policy 206 includes labels 212. Labels 212, in turn, includes tags 704, 706, 708, 710, and 712. Label 704 includes numeric tag 714 with value 10000 and full name 716 with value TS:ALPHA,BETA:US, Label 706 includes numeric tag 718 with value 10001 and full name 720 with value S:ALPHA,BETA:CA, Label 708 includes numeric tag 722 with value 10002 and full name 724 with value U:ALPHA:US,CA, Label 710 includes numeric tag 726 with value 10003 and full name 728 with value U:BETA:US, and tag 712 includes numeric tag 730 with value 10004 and full name 732 with value U:ALPHA:US.

Figure 8:
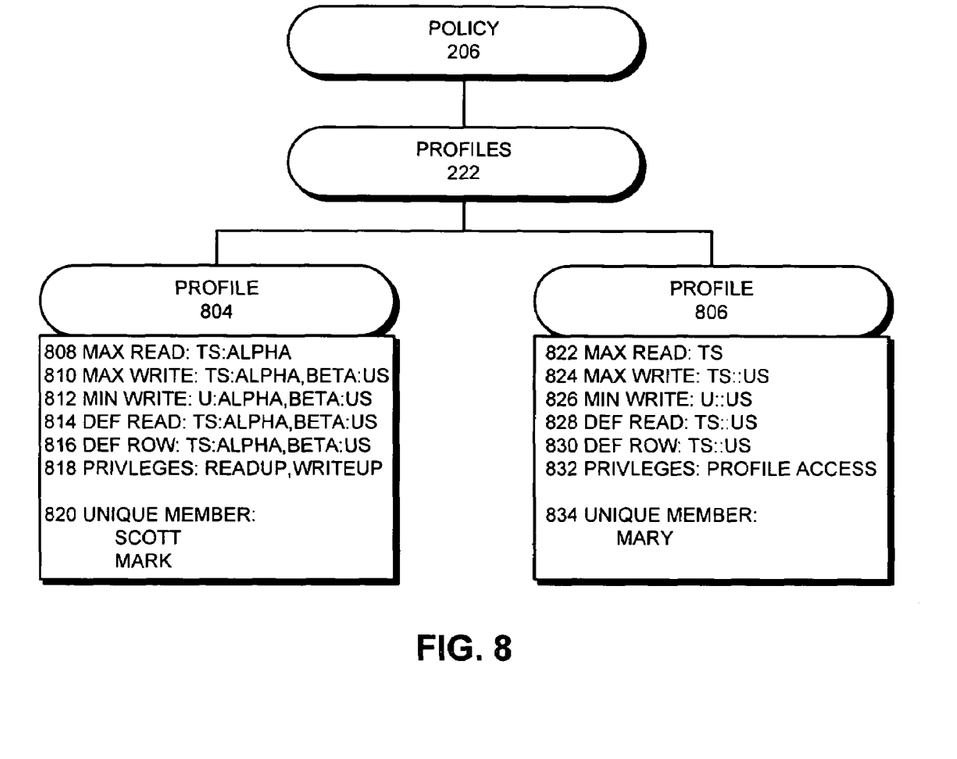
FIG. 8 illustrates security profiles in accordance with an embodiment of the present invention.

Labels 704, 706, 708, 710, and 712 relate a numeric tag to a full name of a label which comprises of levels, compartments, and groups. The numeric tags can be stored in the table columns and hence specify the levels, compartments, and groups for the specific label Security Profiles FIG. 8 illustrates security profiles in accordance with an embodiment of the present invention. Policy 206 includes profiles 222. Profiles 222, in turn, includes profiles 804 and 806. Profiles 804 and 806 are exemplary profiles, which specify the user label authorizations of a member assigned to the profile.

Profile 804 includes max read 808 with value TS:ALPHA, max write 810 with value TS:ALPHA,BETA:US, min write 812 with value U:ALPHA,BETA:US, def read 814 with value TS:ALPHA,BETA:US, def row 816 with value TS:ALPHA, BETA:US, privileges 818, with value READUP,WRITEUP and unique member 820 with users SCOTT and MARK. Max read 808, max write 810, min write 812, def read 814, and def row 816 specify the levels, compartments, and groups for the specific items within profile 804, and privileges 818 specifies the authorized privileges. Unique member 820 specifies the individuals and entities assigned to profile 804.

Profile 806 includes max read 822 with value TS, max write 824 with value TS::US, min write 826 with value U::US, def read 828 with value TS::US, def row 830 with value TS::US, privileges 832 with value PROFILE_ACCESS, and unique member 834 with user MARY. Max read 822, max write 824, min write 826, def read 828, and def row 830 specify the levels, compartments, and groups for the specific items within profile 806, and privileges 832 specifies the authorized privileges. Unique member 834 specifies the individuals and entities assigned to profile 806.

Administrators

Figure 9:
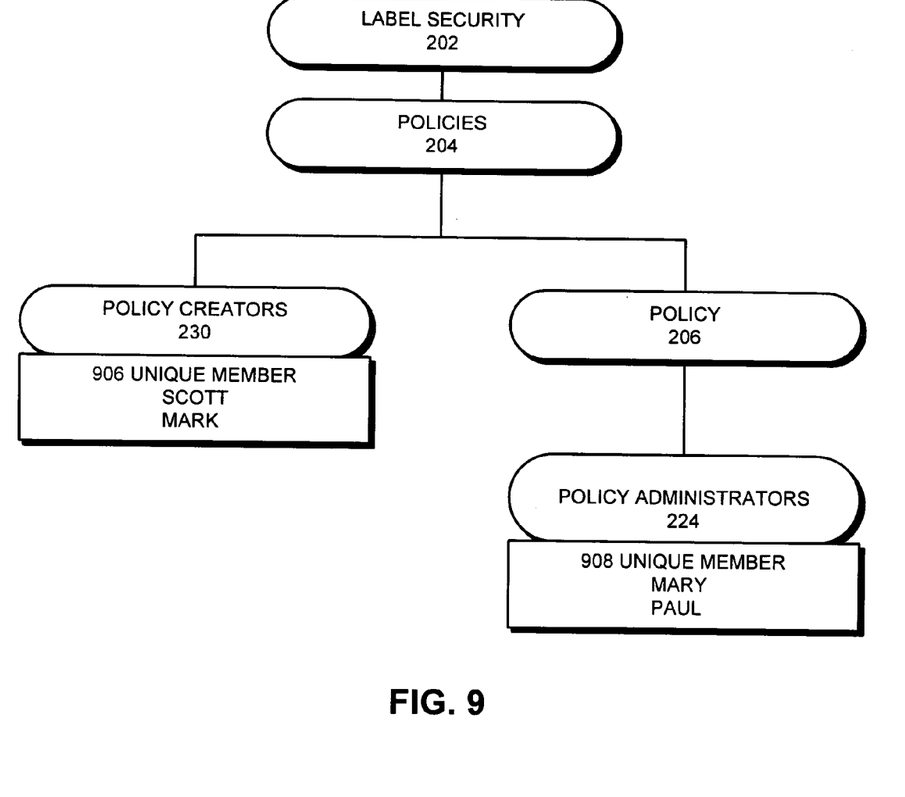
FIG. 9 illustrates administrators in accordance with an embodiment of the present invention.

FIG. 9 illustrates administrators in accordance with an embodiment of the present invention. Policies 204 includes policy creators 230, which includes unique member 906 specifying the individuals and entities authorized to create policies. Each policy within policies 204 includes an administrator's entry for specifying the individuals and entities that are authorized to maintain the policy. For example, policy 206 includes administrators 224. Administrators 224 includes unique member 908, which specifies the administrators for policy 206.

Database Registrations

Figure 10:
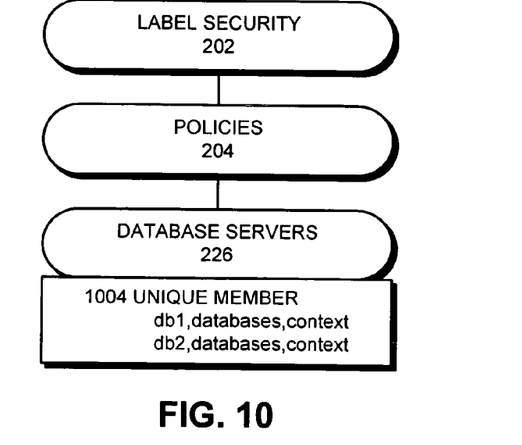
FIG. 10 illustrates database registrations in accordance with an embodiment of the present invention.

FIG. 10 illustrates database registrations in accordance with an embodiment of the present invention. The registrations are organized as follows. Policies 204 includes database servers 226. Database servers 226 includes unique member 1004 which lists the distinguished name of the databases registered for policies 204.

Creating Label-Based Security Policies

Figure 11:
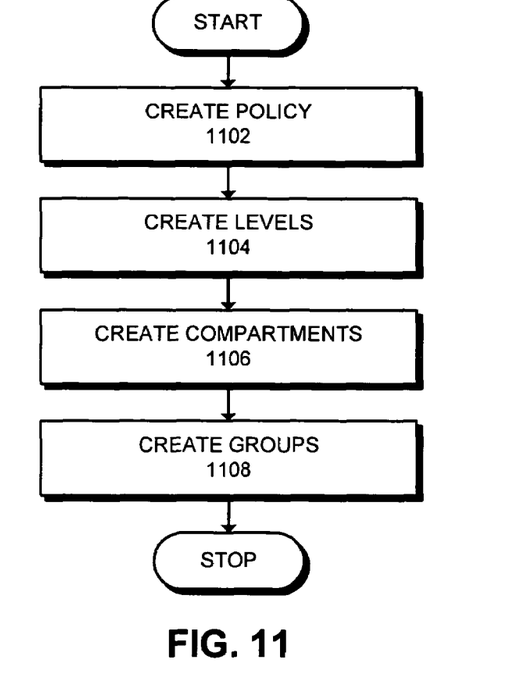
FIG. 11 presents a flowchart illustrating the process of creating label-based security policies in accordance with an embodiment of the present invention.

FIG. 11 presents a flowchart illustrating the process of creating label-based security policies in accordance with an embodiment of the present invention. The system starts when a new policy is created (step 1102). The system then creates levels (step 1104), compartments (step 1106), and groups (step 1108). Note that steps 1104, 1106, and 1108 can be performed in any order.

Assigning Labels to Users

Figure 12:
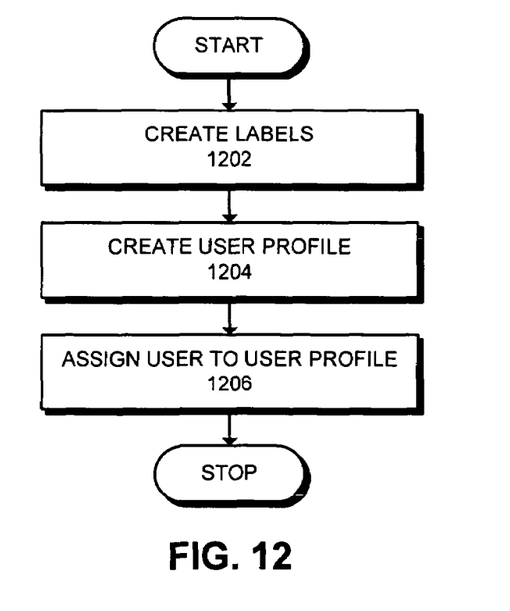
FIG. 12 presents a flowchart illustrating the process of assigning users to labels in accordance with an embodiment of the present invention.

FIG. 12 presents a flowchart illustrating the process of assigning labels to users in accordance with an embodiment of the present invention. The system starts when labels are created (step 1202). Next, the system creates user level profiles (step 1204). Finally, the system assigns users to the user profiles (step 1206).

Registering a Database for Access by a User

Figure 13:
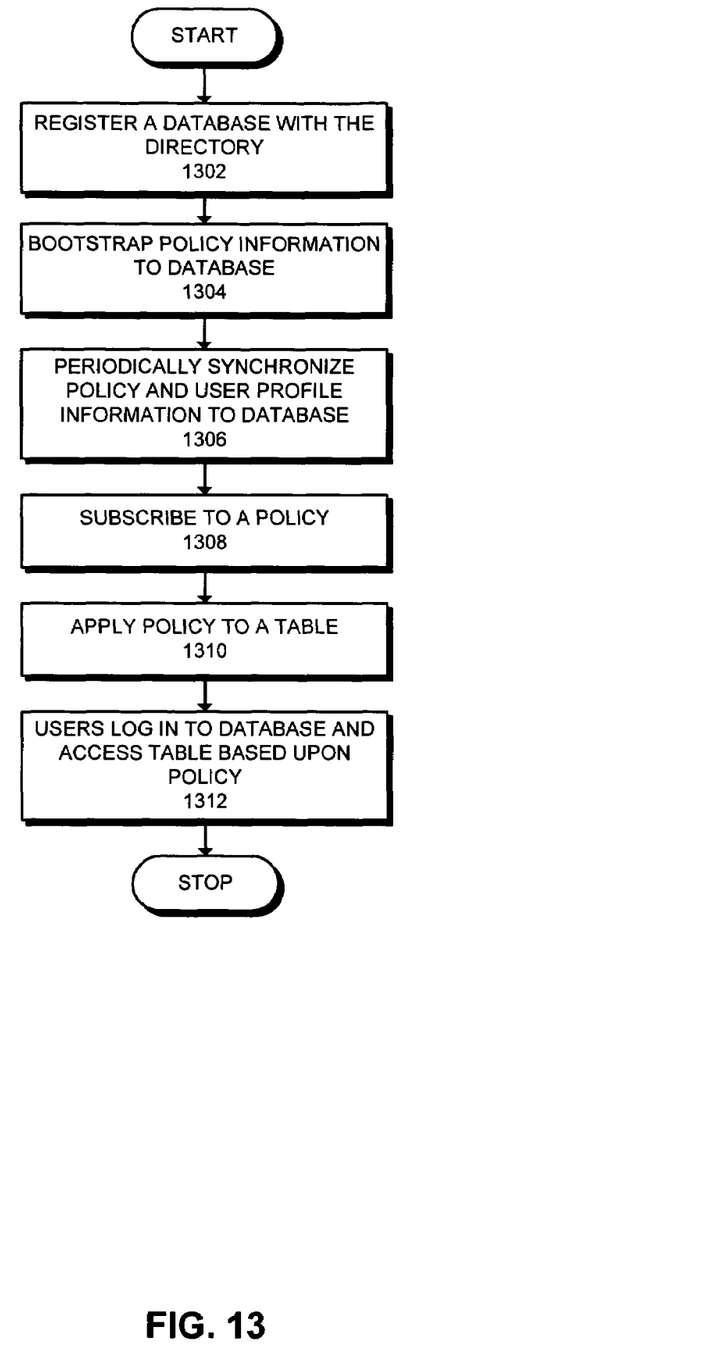
FIG. 13 presents a flowchart illustrating the process of registering a database with a directory and using the policy information for access controls in the database in accordance with an embodiment of the present invention.

FIG. 13 presents a flowchart illustrating the process of registering a database for access by a user in accordance with an embodiment of the present invention. The system starts when a database is registered with the directory containing label-based security policies (step 1302). Next, the system bootstraps the policy information under 206 and 602 to the database (step 1304). After the bootstrap, the system periodically synchronizes the policy information (includes levels, compartments, user profiles, audit options etc) to the database (step 1306).

The system continues when the database subscribes to a policy (step 1308). Next, the system applies the policy to a table within the database (step 1310). Finally, the system allows user to log in to the database and access the table based upon the policy (step 1312).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing security policies for a plurality of databases in a distributed system, comprising:
    creating a plurality of label security policies; and
    storing a label for a security policy in a directory;
    propagating the label from the directory to each of the plurality of databases in the distributed system;
    wherein the label includes a numeric tag and a full name which indicates a corresponding security level, compartment, and group for the label;
        wherein the security level is indicated by a security-level name and a monotonically increasing or decreasing numeric value;
        wherein the compartment is indicated by a compartment name and a unique value for each data compartment, wherein the compartment has no hierarchical arrangement; and
        wherein the group is indicated by a group name, a group numeric value, and a parent group name, which is for hierarchical access; and
    wherein storing the label in the policy column comprises storing the corresponding numeric tag.

2. The method of claim 1, further comprising managing access to a database by:
    receiving a request to perform an operation on a specified table in the database;
    determining which policies apply to the specified table based on a policy set of one or more policies associated with the specified table; and
    determining whether to perform the operation on a row of the specified table based on a set of labels associated with the row and the set of labels and privileges associated with a user, wherein the set of labels is obtained from the policy set.

3. The method of claim 2, further comprising adding a policy column to the specified table for each policy in the policy set associated with the specified table.

4. The method of claim 3, further comprising storing a label in the policy column for each row, wherein the label is from the set of labels associated with the policy.

5. The method of claim 3,
wherein determining which policies apply further comprises determining whether a column is the policy column; and
enforcing access controls based on a label in the policy column.

6. The method of claim 2, wherein the policy set associated with the specified table includes two or more policies.

7. The method of claim 1, further comprising providing feedback from a database indicating that a policy is in use to update policy information within the directory when a security policy is applied to tables and schemas, thereby ensuring that security policies that are in-use will not be dropped from the directory.

8. A computer-readable storage device storing instructions that when executed by a computer cause the computer to perform a method for managing security policies for a plurality of databases in a distributed system, the method comprising:
creating a plurality of label security policies; and
storing a label for a security policy in a directory;
propagating the label from the directory to each of the plurality of databases in the distributed system;
wherein the label includes a numeric tag and a full name which indicates a corresponding security level, compartment, and group for the label;
wherein the security level is indicated by a security-level name and a monotonically increasing or decreasing numeric value;
wherein the compartment is indicated by a compartment name and a unique value for each data compartment, wherein the compartment has no hierarchical arrangement; and
wherein the group is indicated by a group name, a group numeric value, and a parent group name, which is for hierarchical access; and
wherein storing the label in the policy column comprises storing the corresponding numeric tag.

9. The computer-readable storage device of claim 8, the method further comprising managing access to a database of the plurality of databases by:
receiving a request to perform an operation on a specified table in the database;
determining which policies apply to the specified table based on a policy set of one or more policies associated with the specified table; and
determining whether to perform the operation on a row of the specified table based on a set of labels associated with the row and the set of labels and privileges associated with a user, wherein the set of labels is obtained from the policy set.

10. The computer-readable storage device of claim 9, the method further comprising adding a policy column to the specified table for each policy in the policy set associated with the specified table.

11. The computer-readable storage device of claim 10, the method further comprising storing a label in the policy column for each row, wherein the label is from the set of labels associated with the policy.

12. The computer-readable storage device of claim 10,
wherein determining which policies apply further comprises determining whether a column is the policy column; and
enforcing access controls based on a label in the policy column.

13. The computer-readable storage device of claim 9, wherein the policy set associated with the specified table includes two or more policies.

14. The computer-readable storage device of claim 8, the method providing feedback from a database indicating that a policy is in use to update policy information within the directory when a security policy is applied to tables and schemas, thereby ensuring that security policies that are in-use will not be dropped from the directory.

15. An apparatus for managing security policies for a plurality of databases in a distributed system, comprising:
a creating mechanism configured to create a plurality of label security policies;
a storing mechanism configured to store a label for a security policy in a directory; and
a propagating mechanism configured to propagate the label from the directory to each of the plurality of databases in the distributed system;
wherein the storing mechanism is further configured to store a label for a security policy in a directory;
wherein the label includes a numeric tag and a full name which indicates a corresponding security level, compartment, and group for the label,
wherein the security level is indicated by a security-level name and a monotonically increasing or decreasing numeric value;
wherein the compartment is indicated by a compartment name and a unique value for each data compartment, wherein the compartment has no hierarchical arrangement; and
wherein the group is indicated by a group name, a group numeric value, and a parent group name, which is for hierarchical access; and
wherein storing the label in the policy column comprises storing the corresponding numeric tag.

16. The apparatus of claim 15, further comprising an access mechanism configured to manage access to a database by:
receiving a request to perform an operation on a specified table in the database;
determining which policies to the specified table based on a policy set of one or more policies associated with the specified table; and
determining whether to perform the operation on a row of the specified table based on a set of labels associated with the row and the set of labels and privileges associated with a user, wherein the set of labels is obtained from the policy set.

17. The apparatus of claim 16, further comprising an adding mechanism configured to add a policy column to the specified table for each policy in the policy set associated with the specified table.

18. The apparatus of claim 17, wherein the storing mechanism is further configured to store a label in the policy column for each row, wherein the label is from the set of labels associated with the policy.

19. The apparatus of claim 17,
wherein determining which policies apply further comprises determining whether a column is the policy column; and
enforcing access controls based on a label in the policy column.

20. The apparatus of claim 16, wherein the policy set associated with the specified table includes two or more policies.

21. The apparatus of claim 15, further comprising a feedback mechanism configured to provide feedback from a database indicating that a policy is in use to update policy information within the directory when a security policy is applied to tables and schemas, thereby ensuring that security policies that are in-use will not be dropped from the directory.

* * * * *

UNITED STATES PATENT AND TRADEMARK OFFICE
CERTIFICATE OF CORRECTION

| | | |
|---|---|---|
| PATENT NO. | : 7,657,925 B2 | Page 1 of 1 |
| APPLICATION NO. | : 10/966512 | |
| DATED | : February 2, 2010 | |
| INVENTOR(S) | : Vikram Reddy Pesati et al. | |

It is certified that error appears in the above-identified patent and that said Letters Patent is hereby corrected as shown below:

In column 1, line 20, after "system" insert -- . --.

In column 7, line 5, after "label" insert -- . --.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,657,925 B2  Page 1 of 1
APPLICATION NO. : 10/966512
DATED : February 2, 2010
INVENTOR(S) : Pesati et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Thirtieth Day of November, 2010

David J. Kappos
*Director of the United States Patent and Trademark Office*